United States Patent
Yuzawa

(10) Patent No.: US 9,841,771 B2
(45) Date of Patent: Dec. 12, 2017

(54) PRESSURE-REDUCING VALVE

(71) Applicant: Azbil Corporation, Tokyo (JP)

(72) Inventor: Satoshi Yuzawa, Tokyo (JP)

(73) Assignee: Azbil Corporation, Tokyo (JP)

( * ) Notice: Subject to any disclaimer, the term of this patent is extended or adjusted under 35 U.S.C. 154(b) by 0 days.

(21) Appl. No.: 15/071,287

(22) Filed: Mar. 16, 2016

(65) Prior Publication Data

US 2016/0274600 A1    Sep. 22, 2016

(30) Foreign Application Priority Data

Mar. 16, 2015   (JP) ................... 2015-051792

(51) Int. Cl.
  *F16K 31/12*   (2006.01)
  *G05D 16/06*   (2006.01)
  *F16K 7/12*    (2006.01)

(52) U.S. Cl.
  CPC ........... *G05D 16/0636* (2013.01); *F16K 7/12* (2013.01); *G05D 16/0666* (2013.01); *Y10T 137/7793* (2015.04)

(58) Field of Classification Search
  CPC ............... F16K 7/12; Y10T 137/7836; Y10T 137/7793; Y10T 137/261; Y10T 137/3118; Y10T 137/86043; Y10T 137/86381
  See application file for complete search history.

(56) References Cited

U.S. PATENT DOCUMENTS

| | | | | |
|---|---|---|---|---|
| 762,767 A * | 6/1904 | Scott | ................... | F16K 31/0655 137/495 |
| 2,761,464 A * | 9/1956 | Faust | ................... | G05D 16/163 137/116.5 |
| 3,990,470 A * | 11/1976 | Malec | .................. | G05D 7/0106 137/116.5 |
| 4,055,198 A * | 10/1977 | Iannelli | .............. | G05D 16/0666 137/116.5 |
| 4,431,026 A * | 2/1984 | Fehrenbach | ....... | G05D 16/0658 137/207 |

(Continued)

FOREIGN PATENT DOCUMENTS

JP    H05-40668 A    2/1993
JP    H11-311349 A   11/1999

(Continued)

*Primary Examiner* — Jessica Cahill
(74) *Attorney, Agent, or Firm* — Oblon, McClelland, Maier & Neustadt, L.L.P.

(57) ABSTRACT

A tray is provided between a supply air port member and an exhaust port member. A peripheral edge portion of an opening portion of an exhaust port of the exhaust port member that faces an output chamber side is a conical guiding portion. A spherical body is disposed between the guiding portion and an inner bottom face of a tray. The inner peripheral wall of the tray fits slidably into the outer peripheral surface of the end portion of the exhaust port member positioned within the output chamber. The other end of the poppet valve is caused to contact the outer bottom face of the tray. Thus, the exhaust port and the spherical body are centered automatically at the position of the center of the exhaust port, regardless of the position of the shaft axis of the poppet valve, so that there will be essentially no sliding friction.

2 Claims, 9 Drawing Sheets

(56) References Cited

U.S. PATENT DOCUMENTS

| | | | | |
|---|---|---|---|---|
| 6,068,014 | A * | 5/2000 | Tomita | G05D 16/0666 137/116.5 |
| 6,554,017 | B2 * | 4/2003 | Berger | G05D 16/0663 137/115.13 |
| 6,748,964 | B2 * | 6/2004 | Kilgore | G05D 16/0658 123/457 |
| 2015/0040674 | A1 * | 2/2015 | Ishihara | G01L 19/0636 73/724 |

FOREIGN PATENT DOCUMENTS

| | | |
|---|---|---|
| JP | 2000-120896 A | 4/2000 |
| JP | 2007-218424 A | 8/2007 |

* cited by examiner

PRESSURE-REDUCING VALVE

CROSS-REFERENCE TO RELATED APPLICATION

The present application claims priority to Japanese Patent Application No. 2015-051792, filed Mar. 16, 2015. This application is incorporated herein by reference in its entirety.

FIELD OF TECHNOLOGY

The present invention relates to a pressure-reducing valve for reducing the pressure of a pressurized fluid, and, in particular, relates to a diaphragm-type pressure-reducing valve.

BACKGROUND

Conventionally, in systems, known as processing systems, such as chemical plants, electric power plants, and the like, control is through instruments that are driven through the pressure of a fluid such as, for example, air, instead of electricity, in order to prevent explosions. With pressurized fluid supplied to the instruments, if the pressure is too high, may cause malfunctions or faults, and thus the pressure is reduced through a pressure-reducing valve. One type of pressure-reducing valve is a diaphragm-type pressure-reducing valve (referencing, for example, Japanese Unexamined Patent Application Publication No. 2000-120896).

A diaphragm-type pressure-reducing valve is provided with a first ON/OFF valve that connects or isolates an input chamber and an output chamber, and a second ON/OFF valve that connects or isolates the output chamber and an exhaust chamber, where this first ON/OFF valve and second ON/OFF valve carry out opposite operations alternatingly. Through this, the pressurized fluid that enters into the output chamber from the input chamber is depressurized, and the pressurized fluid that enters into the exhaust chamber passes through an exhaust hole to be expelled to the outside of the pressure-reducing valve.

In this diaphragm-type pressure-reducing valve, the first ON/OFF valve is structured from a supply air port that is formed as a through hole for connecting the input chamber and the output chamber, and a first valve unit that opens and closes an opening portion of the input chamber side of the supply air support, where the second ON/OFF valve is structured from an exhaust port that is formed as a through hole for connecting the output chamber and the exhaust chamber, and a second valve unit for opening/closing the opening portion at the output chamber side of the exhaust port.

The supply air port that structures the first ON/OFF valve is structured in a supply air port member that is provided in a partitioning wall that divides the input chamber and the output chamber, and the exhaust port that structures the second ON/OFF valve is structured in an exhaust port member that is bonded to a diaphragm that separates the output chamber and the exhaust chamber. Moreover, the first valve unit that structures the first ON/OFF valve and the second valve unit that structures the second ON/OFF valve are structured at one end and the other end of a poppet valve.

One example of a conventional diaphragm-type pressure-reducing valve is illustrated in FIG. 7. An enlarged view of the critical portions in FIG. 7 is presented in FIG. 8. In FIG. 7 and FIG. 8, 101 is an input chamber, 102 is an output chamber, 103 is an exhaust chamber, 104 is a partitioning wall for separating the input chamber 101 and the output chamber 102, 105 is a diaphragm for separating the output chamber 102 and the exhaust chamber 103, 106 is a supply air port member that is provided in the partitioning wall 104, 107 is an exhaust port member that is bonded to the diaphragm 105, and 108 is a poppet valve.

A supply air port 106a is formed as a through hole in the supply air port member 106, for connecting the input chamber 101 and the output chamber 102, and an exhaust port 107a is formed as a through hole in the exhaust port member 107 for connecting the output chamber 102 and the exhaust chamber 103.

The poppet valve 108 is structured from a shaft portion (stem) 108a that is inserted into and supported in the supply air port 106a output chamber, an umbrella-shaped valve unit (first valve unit) 108b for opening and closing the opening portion 106a1, facing the input chamber 101 side of the supply air port 106a, formed on one end of the shaft portion 108a, and a valve unit (second valve unit) 108c for opening and closing an opening portion 107a1, facing the output chamber 102 side of the exhaust port 107a, formed on the other end of the shaft portion 108a.

The first valve unit 108b of the poppet valve 108 is biased toward the output chamber 102 side by a poppet valve spring 109, and a first ON/OFF valve 110 is structured from the first valve unit 108b and the supply air port 106a, and a second ON/OFF valve 111 is structured from the second valve unit 108c and the exhaust port 107a.

In this pressure-reducing valve 100, the diaphragm 105 is biased toward the output chamber 102 by a pressure-regulating spring 112, where the degree of biasing of the diaphragm 105 by the pressure-regulating spring 112 is adjusted by a pressure-regulating knob 113, to set the pressure of the pressurized fluid that is outputted from the output chamber 102. This pressure that is set is termed the "setpoint pressure."

The diaphragm 105 is positioned so that, when pressed against the output chamber 102 side, the center of the exhaust port 107a matches the shaft line of the poppet valve 108 (the axis of the shaft portion 108a), so that the opening portion 107a1 of the exhaust port 107a is covered by the second valve unit 108c of the poppet valve 108.

When the diaphragm 105 is biased toward the output chamber 102, the second valve unit 108c of the poppet valve 108 closes the opening portion 107a1 on the output chamber 102 side of the exhaust port 107a, and is pushed against the exhaust port member 107 so that the shaft portion 108a of the poppet valve 108 moves toward the input chamber 101, so that the first valve unit 108b of the poppet valve 108 moves away from the opening portion 106a1 of the supply air port 106a.

In this state, that is, in a state wherein the first ON/OFF valve 110 is open and the second ON/OFF valve 111 is closed, when the pressurized fluid from the outside is inputted into the input chamber 101 through the input flow path 114, the inputted pressurized fluid enters into the output chamber 102 through the supply air port 106a, and is outputted to the outside through an output flow path 115.

In this state, when the output pressure POUT rises above the setpoint pressure, the diaphragm 105 moves toward the exhaust chamber 103. Given this, the second valve unit 108c of the poppet valve 108, which is biased toward the opening portion 107a1 of the exhaust port 107a also undergoes movement toward the exhaust chamber 103, where the movement of the shaft portion 108a of the poppet valve 108 accompanying this movement causes the first valve unit 108a of the poppet valve 108 to close the opening portion 106a1 of the supply air port 106a.

When the diaphragm 105 moves further toward the exhaust chamber 103, the second valve unit 108c of the poppet valve 108 moves away from the opening portion 107a1 of the exhaust port 107a. When this state is produced, that is, when the first ON/OFF valve 110 is closed and the second ON/OFF valve 111 is opened, the pressurized fluid within the output chamber 102 passes through the exhaust port 107a to enter into the exhaust chamber 103, and then is discharged to the outside of the pressure-reducing valve 100 through the exhaust hole 116.

Through this, the pressurized fluid within the output chamber 102 is decompressed, so that the diaphragm 105 is biased toward the output chamber 102, to close the second ON/OFF valve 111. This operation is repeated to achieve regulation of pressure within the output chamber 102, resulting in a pressurized fluid that has been decompressed to the setpoint pressure being outputted to the outside from the output chamber 102 through the output flow path 115.

However, in such a pressure-reduced valve 100, it is difficult to completely cut off the fluid using the second ON/OFF valve 111, and thus there is leakage (bleeding) of pressurized fluid to the outside from second ON/OFF valve 111. Because the bleeding is no more than a release of fluid to the outside, preferably there is as little bleeding as possible. That is, the bleeding from the pressure-reducing valve 100 can be considered to be wasteful of the fluid that is being handled, and a reduction thereof contributes directly to improved environmental friendliness in terms of resource conservation and energy conservation.

Given this, in this pressure-reducing valve 100, the structure is so as to minimize, insofar as is possible, the bleed flow rate, where the bleed flow rate is the leakage of the pressurized fluid to the outside from the second ON/OFF valve 111. This point will be explained in detail below.

In the pressure-reducing valve 100 illustrated in FIG. 7, the diaphragm 105, as illustrated in FIG. 8, must be disposed facing the opening portion 107a1 of the exhaust port 107a and the second valve unit 108c of the poppet valve 108, so that the opening portion 107a1 of the exhaust port 107a will be blocked by the second valve unit 108c of the poppet valve 108 when the diaphragm 105 moves toward the output chamber 102 side. More specifically, when the pressure-reducing valve 100 is assembled, the diaphragm 105 is positioned so that the center of the exhaust port 107a is aligned with the shaft axis of the poppet valve 108.

In the state illustrated in FIG. 8, the main pressure-regulating mechanism is assembled so as to be coaxial, that is, is assembled so that the centerline of the exhaust port 107a and the shaft axis of the poppet valve 108 are coaxial, in the ideal state wherein the bleed flow rate is extremely low. However, this state is difficult to achieve.

That is, because the diaphragm 105 is made from material that has flexibility, the tolerance is large, and thus positioning so that the center of the exhaust port 107a is aligned with the shaft axis of the poppet valve 108 at first in assembly is difficult. Moreover, even if this positioning were possible, the diaphragm 105 is stretched in the process for screwing down the peripheral edges thereof, producing non-uniformities, causing the position to shift.

The variability of the shift in this position appears, as-is, in variability in the bleed flow rate, and thus an upper limit is placed on this variability in the product specification. In practice, assembly on the manufacturing work floor is usually carried out while making fine adjustments in order to reduce the variability to be less than the specification value required for competitiveness in the market. Of course, this requires skill in making adjustments during assembly, and has a negative effect on operating efficiency. Moreover, this also has a negative effect on ease of maintenance in the field.

Note that in the pressure-reducing valve 100 illustrated in FIG. 7, the peripheral edge portion 107b of the opening portion 107a1 of the exhaust port 107a, as illustrated in FIG. 8, is conical, and the tip end of the second valve unit 108c of the poppet valve 108 is hemispherical, so that the tip end of the second valve unit 108c presses against the peripheral edge portion 107b of the opening portion 107a1 of the exhaust port 107a to center the center of the exhaust port 107a on the shaft axis of the poppet valve 108.

That is, as indicated in FIG. 9, with the center of the exhaust port 107a prior to centering indicated by J1, the tip end of the second valve unit 108c is pressed against the peripheral edge portion 107b of the opening portion 107a1 of the exhaust port 107a and the diaphragm 105 is pulled and the tip end of the second valve unit 108c enters into the center of the peripheral edge portion 107b of the opening portion 107a1 so that the center J1 of the exhaust port 107a, prior to centering, will be aligned with the center of J0 of the second valve unit 108c of the poppet valve 108.

However, when this structure is used, the position of the exhaust port 107a in the crosswise direction is constrained by the poppet valve 108, and when the center of the diaphragm 105 is shifted or there is a large deformation strain, then the sliding friction of the guiding portion that guides the sliding of the poppet valve 108 will be large. Note that while in some cases there is a guiding structure between the poppet valve and the exhaust port (referencing, for example, Japanese Unexamined Utility Model Registration Application Publication No. H5-40668, Japanese Unexamined Patent Application Publication No. H11-311349, and Japanese Unexamined Patent Application Publication No. 2007-218424), the same is true in these structures as well, where the sliding friction of the guiding portion will be large.

When the sliding friction of the guiding portion is large, then, from the perspective of controllability, there will be hysteresis and lag time in control operations of the pressure-reducing valve, and when a precision high-speed response instrument is connected to the output side, this has a negative impact on the controllability of the instrument that is connected.

The present invention solves the problems set forth above, and the object thereof is to provide a pressure-reducing valve requiring no skill in adjusting at the time of assembly, wherein it is possible to improve operating efficiency and field maintainability, and wherein essentially no sliding friction is produced even when there is a large offset in the centering of the diaphragm and a large deformation strain.

SUMMARY

In order to achieve the object set forth above, the present invention is a pressure-reducing valve including a container wherein the interior is divided, by a partitioning wall, into a first space which will become an input chamber and a second space which will become an output chamber and an exhaust chamber, wherein an input flow path for a pressurized fluid into the input chamber and an output flow path for the pressurized fluid from the output flow chamber are formed; a diaphragm, disposed in the second space, for dividing the second space into the output chamber, on the partitioning wall side, and the exhaust chamber; an exhaust port member that is bonded to the diaphragm and wherein a connecting hole for connecting the output chamber and the exhaust chamber is formed as an exhaust port; a first biasing member for biasing the exhaust port member toward the output chamber; a supply air port member, disposed on the partitioning wall opposite of the exhaust port member, having a connecting hole for connecting the input chamber and the output chamber formed as a supply air port; a tray having a first inner peripheral wall that fits slidably into an outer peripheral surface of an end portion of an exhaust port member that is positioned in an output chamber or a second inner peripheral wall that fits slidably into an outer peripheral surface of an end portion of a supply air port member that is positioned within an output chamber, and wherein one or more through holes are formed; a spherical body, positioned between an inner bottom face of the tray and the exhaust port member, wherein an opening portion of the exhaust port that faces the output chamber side is opened/closed by a spherical surface thereof; a poppet valve having a shaft portion that passes through and is supported by the supply air port, and a valve unit, formed on one end of the shaft portion, for opening/closing the opening portion of the supply air port that faces the input chamber side, wherein the other end of the shaft portion contacts the outer bottom face of the tray; and a second biasing member for biasing the valve unit toward the output chamber; wherein the exhaust port member has: a guiding portion for guiding movement of the spherical body so that the opening portion of the exhaust port that faces the output chamber side will be blocked by the spherical surface of the spherical body.

In examples of this invention, a tray has a first inner peripheral wall that fits slidably in an outer peripheral surface of an end portion of an exhaust port member that is positioned within an output chamber, or a second peripheral wall that fits slidably in an outer peripheral surface of an end portion of a supply air port member that is positioned within the output chamber, wherein a spherical body is positioned between an inner bottom face of the tray and the exhaust port member, and the other end of a shaft portion of a poppet valve contacts the outer bottom face of the tray. Moreover, the exhaust port member has a guiding portion for guiding the movement of the spherical body to the opening portion of the exhaust port that faces the output chamber side, where, when the sliding movement of the tray narrows the space between the inner bottom face of the tray and the exhaust port member, the movement of the spherical body is guided so that the opening portion of the exhaust ports that faces the output chamber side is blocked by the spherical surface.

In examples of the present invention, if the tray is one that has a first inner peripheral wall, then the tray undergoes sliding movement with the outer peripheral surface of an end portion of the exhaust port member as a guide so that the first inner peripheral wall fits into the outer peripheral surface of the end portion of the exhaust port member in a position within the output chamber. If the present invention is one wherein there is a second inner peripheral wall, then the tray undergoes sliding movement guided by the outer peripheral surface of the end portion of the supply air port member so that the second inner peripheral wall fits into the outer peripheral surface of the end portion of the supply air port member, positioned within the output chamber. In this case, the other end of the shaft portion of the poppet valve contacts the outer bottom face of the tray, and, in a state wherein the other end of the shaft portion of the poppet valve is in contact, the space between the inner bottom face of the tray and the exhaust port member is changed by the sliding movement of the tray, and the opening portion of the exhaust port that faces the output chamber side is opened/closed by the spherical body that is positioned between the inner bottom face of the tray and the exhaust port member.

In this way, the other end of the poppet valve can be brought into contact with the outer bottom face of the tray, and the opening/closing of the opening portion of the exhaust port that faces the output side is carried out by the spherical body that is positioned between the inner bottom face of the tray and the exhaust port member, eliminating the need for the center of the exhaust port and the shaft axis of the poppet valve to be concentric, so that the exhaust port and the stopping component (the spherical body) can be centered automatically at the position of the center of the exhaust port, regardless of the position of the shaft axis of the poppet valve. Moreover, the position of the exhaust port in the crosswise direction is not constrained by the poppet valve, and thus the tray and the poppet valve undergo sliding movements independently, so that essentially no sliding friction is produced on the guiding portion even if there is a large misalignment of the center of the diaphragm or a large deformation strain.

Given the present invention, the other end of the poppet valve is brought into contact with the outer bottom face of the tray and the opening/closing of the opening portion of the exhaust port that faces the output side is carried out by a spherical body that is positioned between the inner bottom face of the tray and the exhaust port member, and thus the exhaust port and the stopping component (spherical body) are centered automatically, regardless of the position of the shaft axis of the poppet valve, eliminating the need for the skill in adjusting during assembly, and enabling an improvement in operating efficiency and field maintainability. Moreover, the crosswise-direction position of the exhaust port is not constrained by the poppet valve, so that even if there is a large offset in the center of the diaphragm or a large deformation strain, essentially no sliding friction will be produced on the guiding portion.

DETAILED DESCRIPTION

Figure 1:
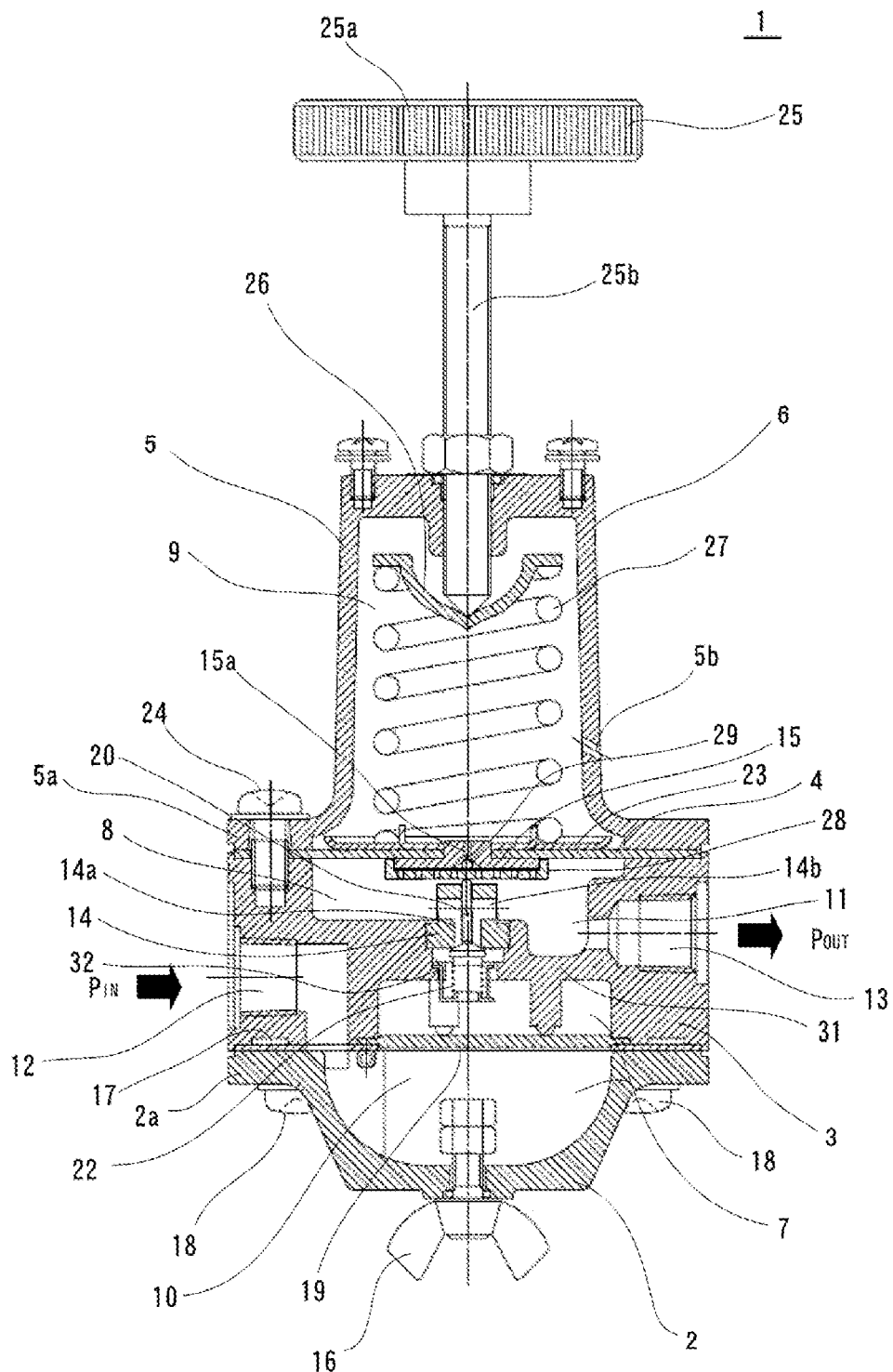
FIG. 1 is a cross-sectional view illustrating the structure of one embodiment of a pressure-reducing valve according to an example of the present invention.
Figure 2:
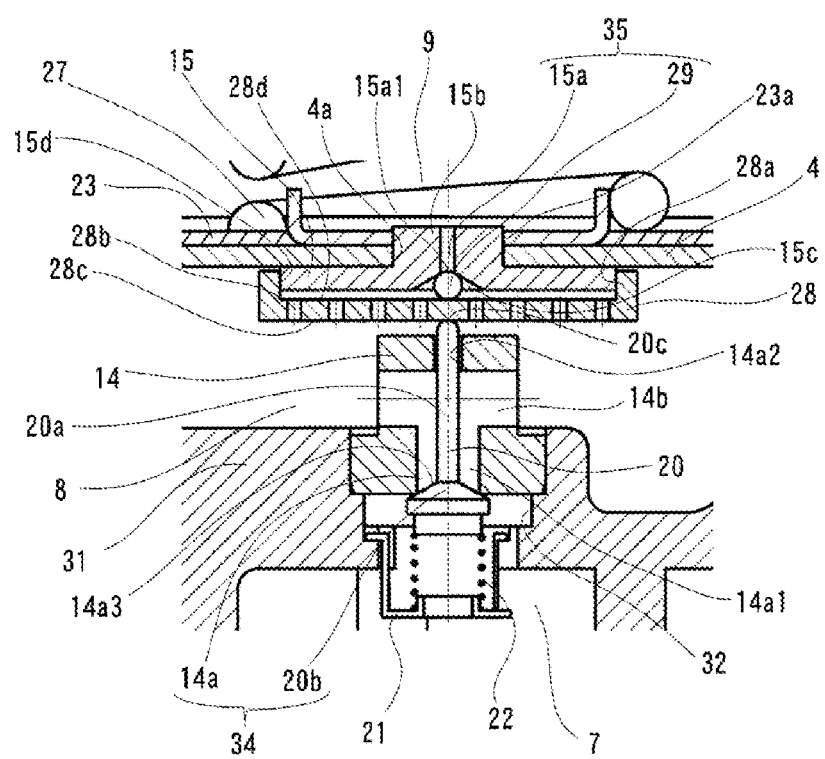
FIG. 2 is an enlarged view of critical portions in FIG. 1 (for an example wherein the center of the exhaust port and the shaft axis of the poppet valve are aligned).

An example according to the present disclosure is explained below in detail, based on the drawings. FIG. 1 is a cross-sectional view illustrating the structure of one embodiment of a pressure-reducing valve according to the present invention, and FIG. 2 is an enlarged view of critical portions in FIG. 1.

The pressure-reducing valve 1 in the present embodiment includes a closed-bottom cylindrical filter cover 2; a cylindrical center body 3, with a partitioning wall 31 formed in the interior thereof, disposed on the filter cover 2; a diaphragm 4 that is disposed on top of the center body 3 so as to cover an upper opening of the center body 3; and a closed-top cylindrical bonnet 5 that is disposed on top of the diaphragm 4, where a container 6 is structured from the filter cover 2, the center body 3, and the bonnet 5.

Within this container 6, a first space 10, for forming an input chamber 7, and a second space 11, for forming an output chamber 8 and an exhaust chamber 9, are separated by a partitioning wall 31. The input chamber 7 is formed between the filter cover 2 and the partitioning wall 31, where the output chamber 8 is formed between the partitioning wall 31 and the diaphragm 4, and the exhaust chamber 9 is formed between the diaphragm 4 and the bonnet 5.

The filter cover 2 is a closed-bottom cylindrical member, formed from, for example, aluminum, or the like. A bolt 16 for draining is screwed into the bottom of the filter cover 2.

The filter cover 2, in a state wherein a flange 2a that is formed on the end portion on the ceiling side is in contact with the outer edge portion of the input chamber 7 side of the center body 3, with a gasket 17 interposed therebetween, is secured to the center body 3 through bolts 18 that are inserted through this flange 2a.

A filter 19, made from a sponge, a stainless steel mesh, or the like, for eliminating dust, is provided in the space between the opening of the center body 3 on the filter cover 2 side and the opening of the filter cover 2 on the ceiling side, that is, in the flow path of the pressurized fluid toward the output chamber 8 side within the input chamber 7.

The center body 3 is a cylindrical member, and is formed from, for example, aluminum, or the like. The interior of the center body 3 is divided into two spaces, upper and lower, by a partitioning wall 31. A through hole 32 is formed in the center portion of this partitioning wall 31, and the supply air port member 14 is provided in this through hole 32.

The supply air port member 14 is formed from, for example, brass, and a through hole that passes through this center portion in the vertical direction, is formed as the supply air port 14a. A branch hole 14b for connecting the supply air port 14a to the output chamber 8 is formed, in a direction that is perpendicular to the supply air port 14a, at the center portion of the supply air port 14a. The inner diameter of the top route 14a1 of the supply air port 14a is a large diameter, and the inner diameter of the bottom route 14a2 of the supply air port 14a is a small diameter.

A poppet valve 20 that is made from, for example, brass or stainless steel, is inserted through and supported by the supply air port 14a. This poppet valve 20 has a shaft portion (stem) 20a and an umbrella-shaped valve unit 20b that is formed on one end of this shaft portion 20a on the input chamber 7 side, where the tip end of the other end 20c of the shaft portion 20a on the output chamber 8 side is a hemisphere.

The outer diameter of the shaft portion 20a of the poppet valve 20 is formed so as to be smaller than the inner diameter of the bottom route 14a1 of the supply air port 14a so that the pressurized fluid can flow between the shaft portion 20a and the bottom route 14a1 of the supply air port 14a. Moreover, the outer diameter of the shaft portion 20a of the poppet valve 20 is slightly smaller than the inner diameter of the upper route 14a2 of the supply air port 14a so that the shaft portion 20a can undergo sliding movement with the inner peripheral surface of the top route 14a2 of the supply air port 14a as the guiding surface. Moreover, the outer diameter of the valve unit 20b of the poppet valve 20 is formed so as to be larger than the inner diameter of the opening portion 14a3 so as to close the opening portion 14a3 of the supply air port 14a that faces the input chamber 7 side.

A poppet spring bearing 21 is supported on the bottom end of the through hole 32 at the face of the partitioning wall 31 that is on the input chamber 7 side. A poppet spring 22 is disposed between the poppet spring bearing 21 and the valve unit 20b of the poppet valve 20. The poppet spring 22 is made from, for example, a coil spring made from stainless steel, and biases the poppet valve 20 toward the output chamber 8. Through this, the other end 20c of the poppet valve 20 protrudes from the top route (the opening portion on the output chamber 8 side) 14a2 of the supply air port 14a.

Moreover, in the center body 3, an input flow path 12 wherein one end is open on the outside face of the center body 3 and the other end is open on the face on the input chamber 7 side, and an output flow path 13, wherein one end is open on the face on the output chamber 8 side and the other hand is open on the outside face of the center body 3, are formed. Moreover, a pipe (not shown) for inputting pressurized fluid from the outside is connected to the opening on the outside face of the center body 3 of the input flow path 12. Moreover, a pipe (not shown) for sending pressurized fluid to the outside is connected to the opening on the outside face of the center body 3 of the output flow path 13.

The diaphragm 4 is a member which, in the plan view, is shaped as an essentially circular film, formed from a material having flexibility such as, for example, nitrile rubber. The diaphragm 4 is formed so that the outer diameter thereof is equal to the outer diameter of the top face of the center body 3. This diaphragm 4 is disposed between the center body 3 and the bonnet 5 in a state wherein the outer edge portions are held between the end portion of the center body 3 on the output chamber 8 side and the opening edge portions of the bonnet 5 on the bottom side. Given this, the diaphragm 4 divides the output chamber 8 and the exhaust chamber 9.

An exhaust port member 15 is bonded to the face of the diaphragm 4 on the output chamber 8 side. This exhaust port member 15 is a disk-shaped member, formed from, for example, brass. The exhaust port member 15 is formed so that the outer diameter thereof is smaller than the outer diameter of the diaphragm 4 and the opening of the center body 3 on the output chamber 8 side.

A circular column-shaped protruding portion 15b is formed in the center portion of the face on the side of the exhaust port member 15 the contacts the diaphragm 4, where this protruding portion 15b is inserted into a through hole 4a that is formed in the center portion of the diaphragm 4, and protrudes from the face of the diaphragm 4 on the exhaust chamber 9 side. Moreover, a through hole that connects between the output chamber 8 and the exhaust chamber 9 is formed as an exhaust port 15a in the center portion of the exhaust port member 15.

An area plate 23 is provided on the face of the diaphragm 4 on the exhaust chamber 9 side. This area plate 23 is a disk-shaped member, and is formed from, for example, brass. The area plate 23 is formed so that the outer diameter thereof is smaller than the outer diameter of the diaphragm 4 and smaller than the bottom opening of the bonnet 5. This area plate 23 is secured to the top face of the diaphragm 4 in a state wherein the protruding portion 15b of the exhaust port member 15 is inserted into a through hole 23a that is formed in the center portion thereof.

The bonnet 5 is a closed-top cylindrical member made from, for example, aluminum. The bonnet 5, in a state wherein a flange 5a that is formed on the bottom end portion of the bonnet 5 is placed on the diaphragm 4, which is placed on the top of the center body 3, is secured to the center body 3, with the diaphragm 4 therebetween, through bolts 24 that are inserted through this flange 5a. An exhaust chamber 9 is formed between the diaphragm 4 and the bonnet 5 thereby. This exhaust chamber 9 is connected to the outside through an exhaust hole 5b that is formed in the side wall of the bonnet 5.

A pressure-regulating knob 25 is screwed into the ceiling of the bonnet 5. This pressure-regulating knob 25 is structured from a knob 25a and a shaft 25b that has one end thereof secured to the knob 25a and the other end thereof positioned within the bonnet 5, where the shaft 25b is screwed into the top of the bonnet 5 with the shaft 25b able to move in the vertical direction.

A pressure-regulating spring bearing 26 that is made from a material such as, for example, steel is disposed within the bonnet 5 in the vicinity of the other end of the shaft 25b of the pressure-regulating knob 25, and a pressure-regulating spring 27 made from, for example, a coil spring that is formed from, for example, spring steel, is disposed between this pressure-regulating spring bearing 26 and the area plate 23 that is secured to the diaphragm 4.

In the output chamber 8, a disk-shaped tray 28, wherein an inner peripheral wall 28a thereof fits slidably in an outer peripheral surface 15d of an end portion of the exhaust port member 15, is provided between the supply air port member 14 and the exhaust port member 15. A plurality of through holes 28b are formed in the bottom face of the tray 28, and the other end 20c of the poppet valve 20 contact the outer bottom face 28c of this tray 28. The tray 28 is formed from, for example, brass.

Moreover, a spherical body 29 is positioned in a center portion of the inner bottom face 28d of the tray 28, and the peripheral edge portion of the opening portion 15a1 of the exhaust port 15a of the exhaust port member 15 that faces the output chamber 8 side is formed into a conical shape. In the present embodiment, the peripheral edge portion of the conical shape is a guiding portion 15c for guiding the movement of the opening portion 15a1 of the spherical body 29, where the spherical body 29 is disposed between the guiding portion 15c and the inner bottom face 28d of the tray 28. The spherical body 29 is formed from, for example, brass or stainless steel.

In this pressure-reducing valve 1, a first ON/OFF valve 34 is structured from a valve unit 20b and a supply air port 14a, and a second ON/OFF valve 35 is structured from the spherical body 29 and the exhaust port 15a. Moreover, the pressure of the pressurized fluid that is outputted from the output chamber 8 is set through adjusting, using the pressure-regulating knob 25, the degree with which the diaphragm 4 is biased by the pressure-regulating spring 27.

In this pressure-reducing valve 1, when the diaphragm 4 is biased toward the output chamber 8, the space between the inner bottom face 28d of the tray 28 and the exhaust port member 15 is narrowed, and the spherical body 29 that is positioned between the conical guiding portion 15c of the exhaust port member 15 and the inner bottom face 28d of the tray 28 is held, so that the opening portion 15a1 of the exhaust port 15a that faces the output chamber 8 side is blocked by the spherical surface of the spherical body 29. Moreover, the other end 20c of the poppet valve 20 that is in contact with the outer bottom face 28c of the tray 28 is pushed down so that the shaft portion 20a of the poppet valve 20 moves toward the input chamber 7, and the valve unit 20b of the poppet valve 20 moves away from the opening portion 14a3 of the supply air port 14a.

In this state, that is, in a state wherein the first ON/OFF valve 34 is open and the second ON/OFF valve 35 is closed, when the pressurized fluid from the outside is inputted into the input chamber 7 through the input flow path 12, the inputted pressurized fluid enters into the output chamber 8 through the supply air port 14a, and is outputted to the outside through an output flow path 13.

In this state, when the output pressure POUT rises above the setpoint pressure, the diaphragm 4 moves toward the exhaust chamber 9. When this occurs, the other end 20c of the poppet valve 20 that is in contact with the outer bottom face 28c of the tray 28 also moves in the direction of the exhaust chamber 9, and the valve unit 20b of the poppet valve 20 blocks the opening portion 14a3 of the supply air port 14a through the movement of the shaft portion 20a of the poppet valve 20, accompanying the movement described above.

Moreover, when the diaphragm 4 moves toward the exhaust chamber 9 to increase the interval between the bottom face 28d of the tray 28 and the exhaust port member 15, the tray 28 is pushed down by the pressurized fluid that flows in through the through holes 28b that are formed in the tray 28, causing the spherical surface of the spherical body 29 to move away from the opening portion 15a1 of the exhaust port 15a that faces the output chamber 8 side. Through this, the second ON/OFF valve 35 is opened, causing the pressurized fluid within the output chamber 8 to enter into the exhaust chamber 9 through the exhaust port 15a, to be released to the outside of the pressure-reducing valve 1 through the exhaust hole 5b, to achieve pressure regulation within the output chamber 8.

Although FIG. 2 illustrates a state wherein the center of the exhaust port 15a is aligned with the shaft axis of the poppet valve 20, in the pressure-reducing valve 1 of the present embodiment, it is not necessary for the center of the exhaust port 15a to be aligned with the shaft axis of the poppet valve 20. That is, in this pressure-reducing valve 1, the other end 20c of the poppet valve 20 is brought into contact with the outer bottom face 28c of the tray 28, and the opening/closing of the opening portion 15a1 of the exhaust port 15a that faces the output side is carried out by the spherical body 29 that is positioned between the bottom face 28d within the tray 28 and the exhaust port member 15, so that even if the center of the exhaust port 15a is not concentric with the shaft axis of the poppet valve 20, the exhaust port 15a will still be blocked reliably by the spherical body 29.

Figure 3:
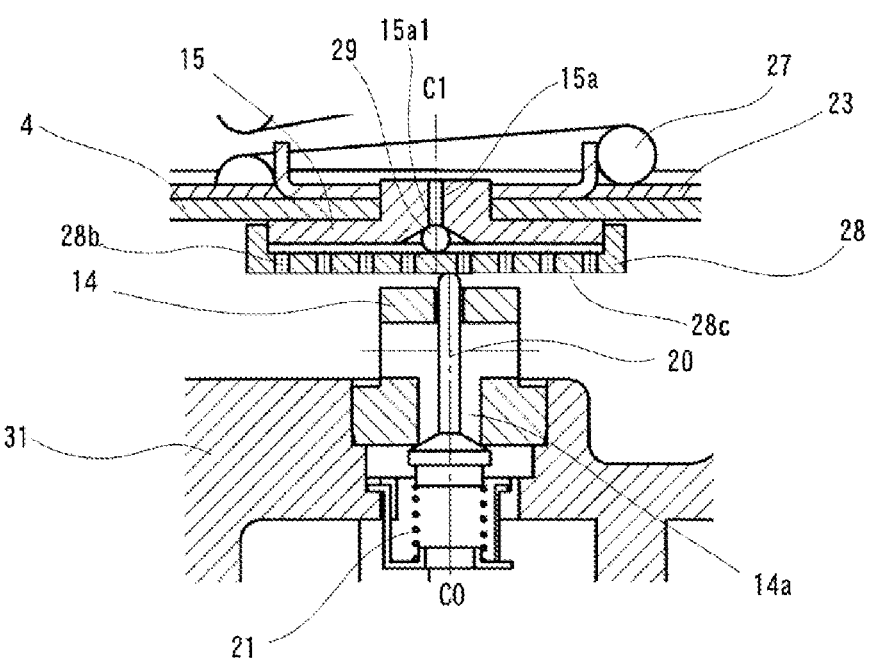
FIG. 3 is an enlarged view of critical portions in FIG. 1 (for an example wherein the center of the exhaust port and the shaft axis of the poppet valve are not aligned).

FIG. 3 shows an example wherein the center of the exhaust port 15a and the shaft axis of the poppet valve 20 are not aligned. In FIG. 3, C1 is the center of the exhaust port 15*a*, and C0 is the shaft axis of the poppet valve 20. As can be appreciated from this diagram as well, in this pressure-reducing valve 1, the opening/closing of the opening portion 15*a*1 of the exhaust port 15*a* that faces the output side is carried out by the spherical body 29, where the other end 20*c* of the poppet valve 20 is brought into contact with the outer bottom face 28*c* of the tray 28 that receives this spherical body 29, and thus the exhaust port 15*a* and the stopping component (the spherical body 29) are centered automatically to the position of the center C1 of the exhaust port 15*a* regardless of the position of the shaft axis C0 of the poppet valve 20.

Because of this, the technique for adjusting during assembly of the pressure-reducing valve 1 is rendered unnecessary, enabling an improvement in operating efficiency and field maintainability. Moreover, in this pressure-reducing valve 1, the crosswise-direction position of the exhaust port 15*a* is not constrained by the poppet valve 20, and the tray 28 and the poppet valve 20 each undergo independent sliding movement, so that even if the diaphragm 4 is shifted largely from the center or even if there is a large deformation strain, still essentially no sliding friction is produced on the guiding portion for guiding the sliding of the tray 28 and the poppet valve 20.

Figure 4:
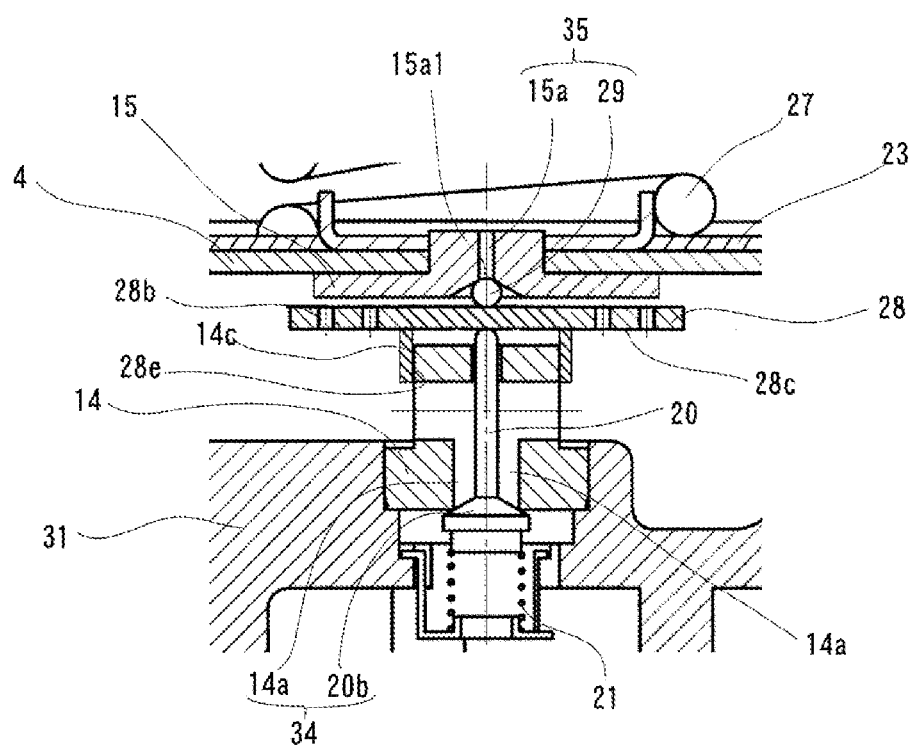
FIG. 4 is an enlarged view of critical portions in another example of a pressure-reducing valve according to the present invention (for an example wherein the center of the exhaust port and the shaft axis of the poppet valve are aligned).

Note that while in the example described above, an inner peripheral wall 28*a* was provided on the exhaust port member 15 side of the tray 28 and the inner peripheral wall 28*a* is formed so as to fit slidably in the outer peripheral surface 15*d* of the end portion of the exhaust port member 15 that is positioned within the output chamber 8, instead, as illustrated in FIG. 4, an inner peripheral wall 28*e* may be provided on the supply air port member 14 side of the tray 28, and this inner peripheral wall 28*e* may be formed so as to fit slidably into the outer peripheral surface 14*c* of the end portion of the supply air port member 14 that is positioned within the output chamber 8.

In the structure illustrated in FIG. 4, when the space between the inner bottom face 28*d* of the tray 28 and the exhaust port member 15 is increased, then the tray 28 is pushed down by the fluid that flows in through the gap between the tray 28 and the exhaust port member 15 and through the screw holes 28*b* that are formed in the tray 28, causing the spherical surface of the spherical body 29 to move away from the opening portion 15*a*1 of the exhaust port 15*a* that faces the output chamber 8 side. Through this, the second ON/OFF valve 35 is opened, and the pressurized fluid within the output chamber 8 enters into the exhaust chamber 9 through the exhaust port 15*a*, to be released to the outside of the pressure-reducing valve 1 from the exhaust hole 5*b*, to achieve pressure regulation of the output chamber 8.

Figure 5:
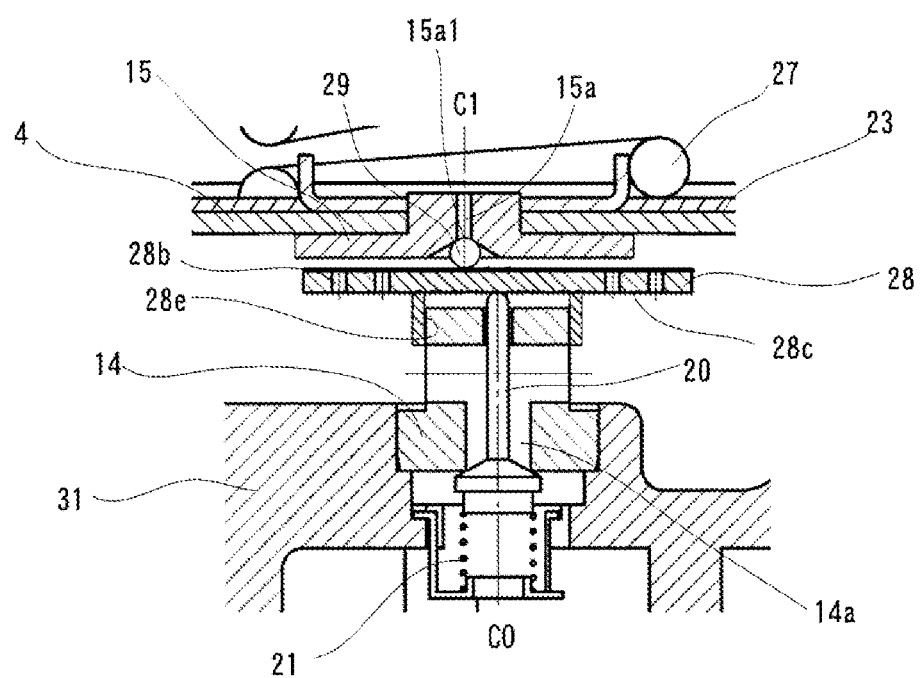
FIG. 5 is an enlarged view of critical portions in a further example of a pressure-reducing valve according to the present invention (for an example wherein the center of the exhaust port and the shaft axis of the poppet valve are not aligned).

FIG. 5 shows an example wherein the center of the exhaust port 15*a* and the shaft axis of the poppet valve 20 are not aligned, in the structure illustrated in FIG. 5.

Even in the structure illustrated in FIG. 4, the opening/closing of the opening portion 15*a*1 of the exhaust port 15*a* that faces the output side is carried out by the spherical body 29, and the other end 20*c* of the poppet valve 20 is brought into contact with the outer bottom face 28*c* of the tray 28 that receives the spherical body 29, and thus the exhaust port 15*a* and the stopping component (the spherical body 29) are centered automatically at the position of the center C1 of the exhaust port 15*a*, regardless of the position of the shaft axis C0 of the poppet valve 20.

Moreover, the crosswise-direction position of the exhaust port 15*a* is not constrained by the poppet valve 20, and the tray 28 and the poppet valve 20 each undergo independent sliding movement, so that even if the diaphragm 4 is shifted largely from the center or even if there is a large deformation strain, still essentially no sliding friction is produced on the guiding portion for guiding the sliding of the tray 28 and the poppet valve 20.

Figure 6:
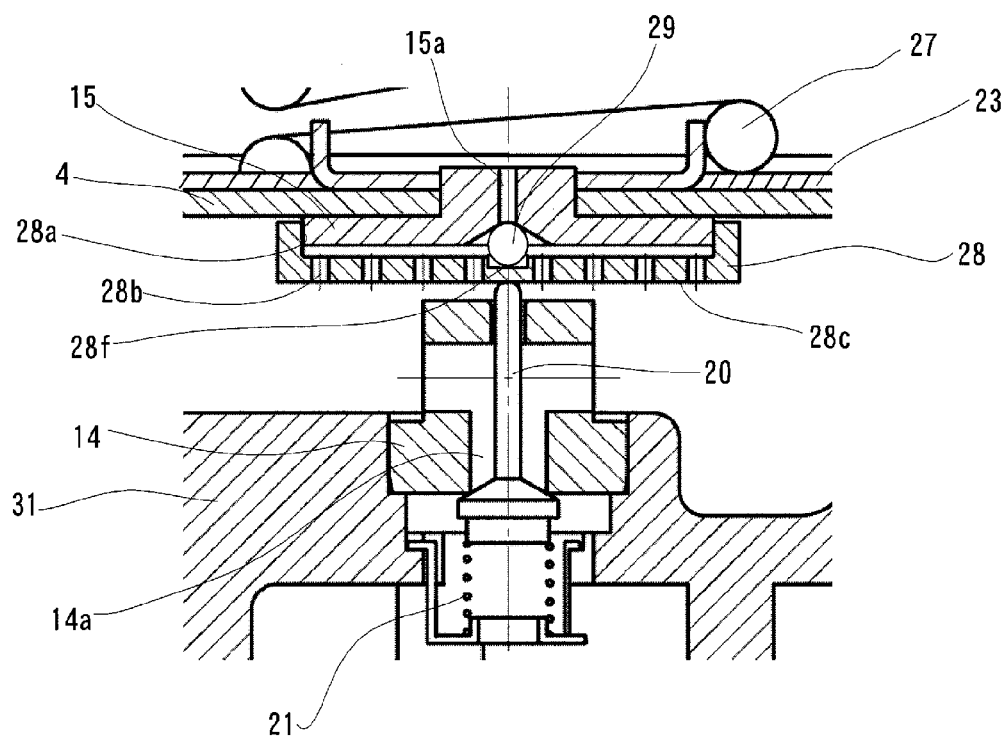
FIG. 6 is a diagram illustrating an example wherein a recessed portion is formed, so as to receive a bottom portion of a spherical body, in the inner bottom face of the tray in the structure illustrated in FIG. 1.
Figure 7:
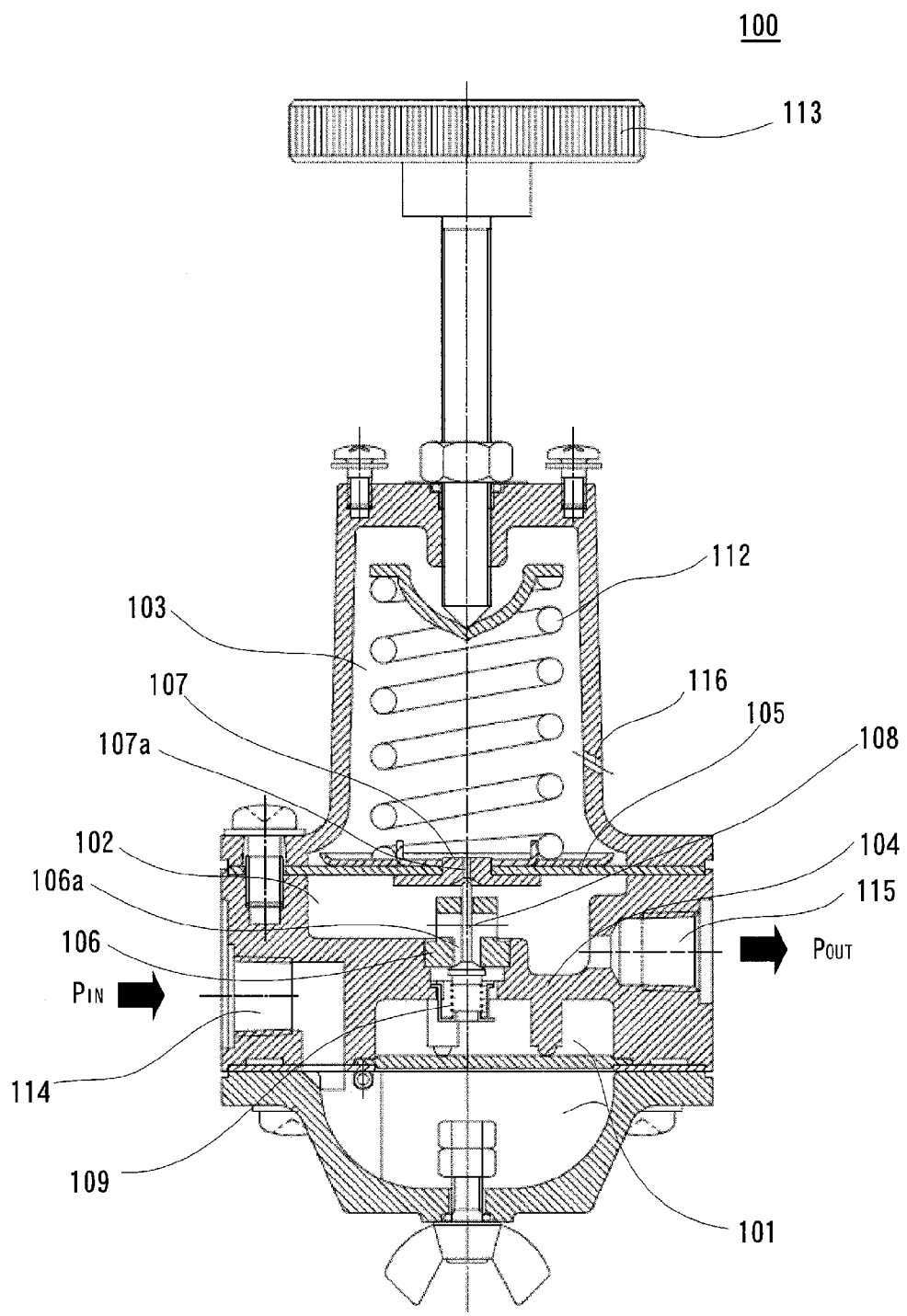
FIG. 7 is a structural diagram illustrating an example of a pressure-reducing valve of a conventional diaphragm type.
Figure 8:
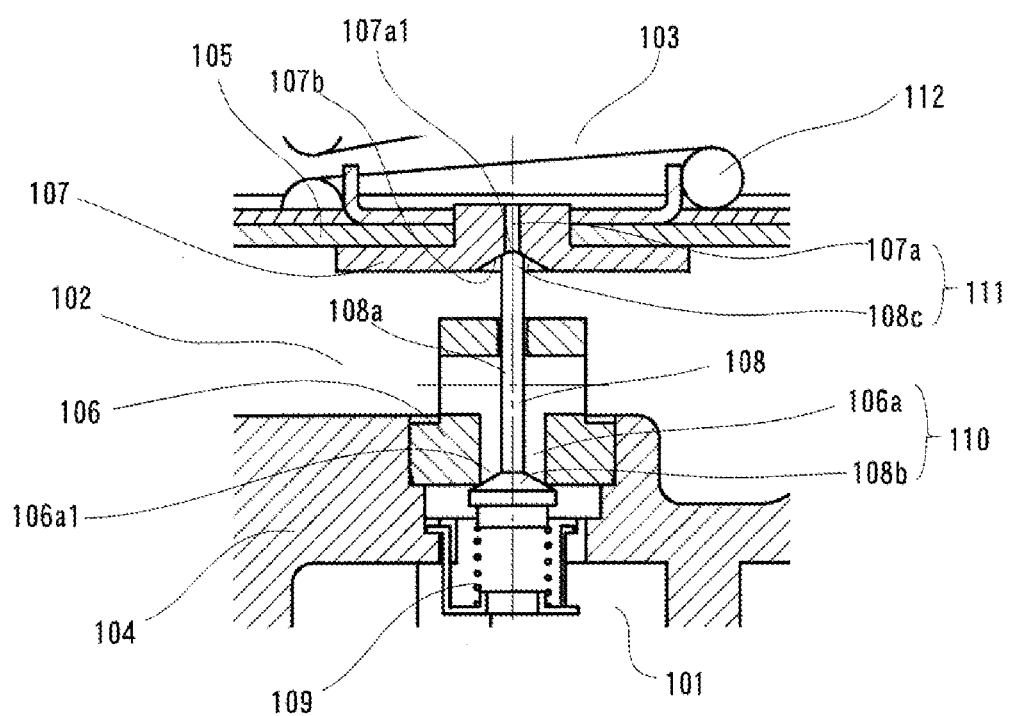
FIG. 8 is an enlarged view of critical portions in FIG. 7 (for an example wherein the center of the exhaust port and the shaft axis of the poppet valve are aligned).
Figure 9:
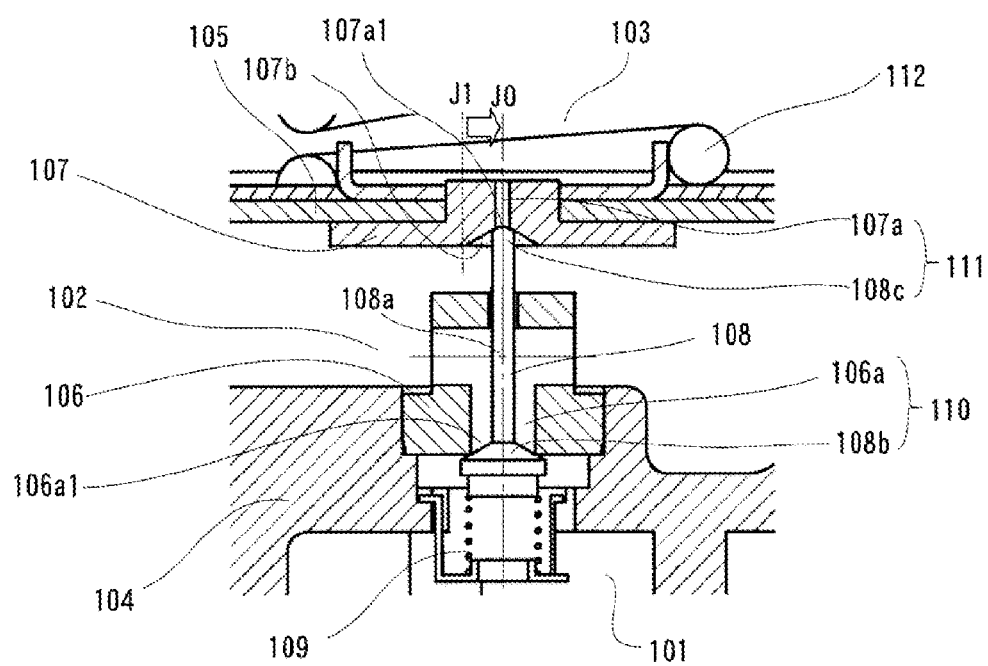
FIG. 9 is an enlarged view of critical portions in FIG. 7 (for an example wherein the center of the exhaust port and the shaft axis of the poppet valve are not aligned).

Moreover, in the embodiment described above, the inner bottom face 28*d* of the tray 28 may be a flat face, and a recessed portion 28*f* may be formed in the position of the inner bottom face 28*d* of the tray 28 that opposes the opening portion 15*a*1 of the exhaust port 15*a* that faces the output chamber 8 side, as illustrated in FIG. 6, with the spherical body 29 placed in the inner bottom face 28*d* that is this flat face, where the spherical body 29 may drop into this recessed portion 28*f*, to receive the bottom portion of the spherical body 29. When this is done, this determines the position of the spherical body 29 within the tray 28, making assembly of the tray 28 with the exhaust port member 15 easy as well.

While in the example set forth above the tip end of the other end 20*c* of the poppet valve 20 was hemispherical, it need not necessarily be hemispherical. For example, in the structure illustrated in FIG. 2, the tip end of the other end 20*c* of the poppet valve 20 may be a T-shaped plate surface, where the T-shaped plate surface may be brought into contact with the outer bottom face 28*c* of the tray 28.

In the structure illustrated in FIG. 2, the tip end of the other end 20*c* of the poppet valve 20 was hemispherical, and the hemispherical tip end strikes against the outer bottom face 28*c* of the tray 28, so that the outer bottom face 28*c* of the tray 28 is supported by only a single point, and thus there may be concerns that the sliding movement will be unstable. When, in response, the tip end of the other end 20*c* of the poppet valve 20 is formed as a T-shaped plate surface, the outer bottom face 28*c* of the tray 28 will provide support as a surface, enabling the sliding movement of the tray 28 to be carried out with stability.

Moreover, while in the structure illustrated in FIG. 4, the tip end of the other end 20*c* of the poppet valve 20 was such that it strikes against the outer bottom face 28*c* of the tray 28, instead the tip end of the other end 20*c* of the poppet valve 20 may be secured to the outer bottom face 28*c* of the tray 28. In this case, the tray 28 will undergo sliding movement together with the poppet valve 20. A state wherein the tip end of the other end 20*c* of the poppet valve 20 is secured to the outer bottom face 28*c* of the tray 28, as in this example, is also included as one example of a state wherein the other end of the shaft portion of the bottom valve is in contact with the outer bottom face of the tray, as set forth in the present invention.

Moreover, while in the examples set forth above the peripheral edge portion of the opening portion 15*a*1 of the exhaust port 15*a* of the exhaust port member 15 that faces the output chamber 8 side was conical, and the conical peripheral edge portion was used as the guiding portion 15*c* for guiding the movement of the spherical body 29, there is no limitation to the guiding portion 15*c* being conical. Moreover, the pressurized fluid that is inputted into, and outputted from, the pressure-reducing valve 1 may be either a liquid or a gas.

In the examples set forth above, there may be one or more through holes 28*b* provided in the tray 28, or the tray 28 may be, for example, formed as a mesh, to enable passage of the pressurized fluid that is to be exhausted.

Moreover, the pressure-reducing valve according to the present invention may be applied for the purpose of reducing bleeding in, for example, a pilot relay for supplying/exhausting fluid, and may be used in, for example, valve positioners and electro-pneumatic converters. Pilot relays for supplying/exhausting fluid have many points in common in the internal valve structure.

While the present disclosure has been explained above in reference to an example, the present disclosure is not limited to the examples set forth above. The structures and details in the present disclosure may be varied in a variety of ways, as can be understood by one skilled in the art, within the scope of technology in the present disclosure.

What is claimed is:

1. A pressure-reducing valve, comprising:
   a container having an interior that is divided, by a partitioning wall, into a first space, which becomes an input chamber, and a second space, which becomes an output chamber and an exhaust chamber, wherein an input flow path of a pressurized fluid into the input chamber and an output flow path of the pressurized fluid from the output chamber are formed;
   a diaphragm, disposed in the second space, for dividing the second space into the output chamber, on the partitioning wall side, and the exhaust chamber;
   an exhaust port member bonded to the diaphragm, wherein a connecting hole connecting the output chamber and the exhaust chamber is formed as an exhaust port;
   a first biasing member biasing the exhaust port member toward the output chamber;
   a supply air port member, disposed on the partitioning wall opposite of the exhaust port member, having a connecting hole connecting the input chamber and the output chamber formed as a supply air port;
   a tray comprising a first inner peripheral wall that fits slidably into an outer peripheral surface of an end portion of the exhaust port member that is positioned in the output chamber or a second inner peripheral wall that fits slidably into an outer peripheral surface of an end portion of the supply air port member that is positioned within the output chamber, and wherein one or more through holes are formed;
   a spherical body, positioned between an inner bottom face of the tray and the exhaust port member, wherein an opening portion of the exhaust port that faces the output chamber side is opened/closed by a spherical surface thereof;
   a poppet valve comprising a shaft portion that passes through and is supported by the supply air port, and a valve unit, formed on one end of the shaft portion, for opening/closing the opening portion of the supply air port that faces the input chamber side, wherein the other end of the shaft portion contacts the outer bottom face of the tray; and
   a second biasing member biasing the valve unit toward the output chamber,
   wherein the exhaust port member includes a guiding portion to guide movement of the spherical body so that the opening portion of the exhaust port that faces the output chamber side will be blocked by the spherical surface of the spherical body.

2. The pressure-reducing valve as set forth in claim 1, wherein the tray further comprises a recessed portion receiving a bottom portion of the spherical body in a position of the inner bottom face that faces an opening portion of the exhaust port that faces the output chamber side.

* * * * *